United States Patent
Heren et al.

(10) Patent No.: US 10,717,424 B2
(45) Date of Patent: Jul. 21, 2020

(54) VARIABLE-TORQUE EMERGENCY BRAKE DEVICE

(71) Applicant: POCLAIN HYDRAULICS INDUSTRIE, Verberie (FR)

(72) Inventors: Jean Heren, Verberie (FR); Andre Prigent, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 15 days.

(21) Appl. No.: 16/019,414

(22) Filed: Jun. 26, 2018

(65) Prior Publication Data

US 2018/0370511 A1    Dec. 27, 2018

(30) Foreign Application Priority Data

Jun. 27, 2017    (FR) ...................................... 17 55911

(51) Int. Cl.
*B60T 13/22* (2006.01)
*B60T 13/68* (2006.01)
(Continued)

(52) U.S. Cl.
CPC ............ *B60T 13/588* (2013.01); *B60T 1/065* (2013.01); *B60T 7/045* (2013.01); *B60T 8/17* (2013.01); *B60T 8/176* (2013.01); *B60T 8/1766* (2013.01); *B60T 8/1769* (2013.01); *B60T 8/17616* (2013.01); *B60T 8/1812* (2013.01); *B60T 8/1881* (2013.01); *B60T 8/326* (2013.01); *B60T 8/343* (2013.01); *B60T 8/36* (2013.01); *B60T 8/368* (2013.01); *B60T 8/3615* (2013.01); *B60T 8/3635* (2013.01); *B60T 8/38* (2013.01); *B60T 8/404* (2013.01); *B60T 8/4027* (2013.01);
(Continued)

(58) Field of Classification Search
CPC ...... B60T 13/22; B60T 13/141; B60T 13/686; B60T 17/085; B60T 17/086; B60T 8/176
USPC .......................................... 188/170; 303/9.76
See application file for complete search history.

(56) References Cited

U.S. PATENT DOCUMENTS

| 4,349,233 A | 9/1982 | Bullard et al. |
| 4,458,791 A * | 7/1984 | Schneider ............. B60T 13/141 188/170 |

(Continued)

FOREIGN PATENT DOCUMENTS

| DE | 3604451 A1 * | 8/1987 | ................ B60T 8/00 |
| EP | 1193152 A2 | 4/2002 | |

(Continued)

OTHER PUBLICATIONS

Preliminary Research Report received for French Application No. 1755911, dated Mar. 2, 2018, 3 pages (1 page of French Translation Cover Sheet and 2 pages of original document).

*Primary Examiner* — Thomas J Williams
(74) *Attorney, Agent, or Firm* — Womble Bond Dickinson (US) LLP

(57) ABSTRACT

An emergency braking device including an actuator (2), a pressurizing circuit (3) supplying the actuator (2) via a control pressure and a discharge circuit (4). The discharge circuit (4) includes restrictors (13, 14) for controlling the pressure and/or flow rate of the supply fluid of the actuator (2) during a discharge of the actuator. The restrictors (13, 14) are configured to define an intermediate pressure between a low pressure level and the control pressure of the actuator (2).

17 Claims, 5 Drawing Sheets

(51) Int. Cl.

| | | |
|---|---|---|
| *B60T 17/08* | (2006.01) | |
| *B60T 13/58* | (2006.01) | |
| *B60T 8/36* | (2006.01) | |
| *B60T 8/1769* | (2006.01) | |
| *B60T 8/40* | (2006.01) | |
| *B60T 8/92* | (2006.01) | |
| *B60T 13/66* | (2006.01) | |
| *B60T 8/50* | (2006.01) | |
| *B60T 8/32* | (2006.01) | |
| *B60T 8/1766* | (2006.01) | |
| *B60T 8/1761* | (2006.01) | |
| *B60T 8/17* | (2006.01) | |
| *B60T 8/38* | (2006.01) | |
| *B60T 13/16* | (2006.01) | |
| *B60T 7/04* | (2006.01) | |
| *B60T 8/18* | (2006.01) | |
| *B60T 8/90* | (2006.01) | |
| *B60T 8/34* | (2006.01) | |
| *B60T 8/88* | (2006.01) | |
| *B60T 1/06* | (2006.01) | |
| *B60T 8/176* | (2006.01) | |
| *B60T 15/04* | (2006.01) | |
| *B60T 17/02* | (2006.01) | |

(52) U.S. Cl.
CPC .......... *B60T 8/4036* (2013.01); *B60T 8/4054* (2013.01); *B60T 8/50* (2013.01); *B60T 8/5012* (2013.01); *B60T 8/5018* (2013.01); *B60T 8/5025* (2013.01); *B60T 8/5081* (2013.01); *B60T 8/5087* (2013.01); *B60T 8/88* (2013.01); *B60T 8/90* (2013.01); *B60T 8/92* (2013.01); *B60T 13/16* (2013.01); *B60T 13/22* (2013.01); *B60T 13/66* (2013.01); *B60T 13/662* (2013.01); *B60T 13/68* (2013.01); *B60T 13/686* (2013.01); *B60T 15/041* (2013.01); *B60T 17/02* (2013.01); *B60T 17/085* (2013.01)

(56) References Cited

U.S. PATENT DOCUMENTS

| | | | | |
|---|---|---|---|---|
| 5,779,325 | A * | 7/1998 | Diesel | B60T 13/683 |
| | | | | 188/170 |
| 7,273,136 | B2 * | 9/2007 | Goto | B60T 13/04 |
| | | | | 188/170 |
| 7,357,462 | B2 * | 4/2008 | Uphues | B60T 13/22 |
| | | | | 303/2 |
| 2014/0225426 | A1 | 8/2014 | Dabbs | |

FOREIGN PATENT DOCUMENTS

| | | |
|---|---|---|
| EP | 1541438 A2 | 6/2005 |
| EP | 2465743 A1 | 6/2012 |
| FR | 2964073 A1 | 3/2012 |
| FR | 3002991 A1 | 9/2014 |
| FR | 3033613 A1 | 9/2016 |
| GB | 2193772 A | 2/1988 |
| WO | 2008/078005 A1 | 7/2008 |

\* cited by examiner

VARIABLE-TORQUE EMERGENCY BRAKE DEVICE

GENERAL TECHNICAL FIELD AND PRIOR ART

The invention relates to the braking of rotating machines, especially within vehicles.

For those vehicles having a slow travel speed, typically under 30 km/h, an evolution in legislation, especially in France and Europe, authorises the use of parking braking system for emergency braking situations.

A deceleration rate is indicated for responding to the criteria of this use, this deceleration rate corresponding to braking torque calculated in the region of the wheels on which the parking braking system acts.

Parking braking systems are usually configured to ensure a fixed position of the vehicle in all potential situations linked to its field of use, for example on very uneven and/or sloping terrain, and as a consequence have substantial braking torque.

Relevant vehicles, having slow travel speed, are generally farm machines or construction machines, the use of which exposes the machine to very demanding environments.

In reference to the attached FIG. 1, a classic braking system of the prior art comprises a hydraulic control system 1 for activating or deactivating a single-action actuator 2, comprising a chamber 19, a piston 16 and an elastic element 17. This is typically a negative brake, that is, the braking force is exerted when the brake is not being supplied with pressure and by way of contrast a hydraulic pressure feed applied in the chamber 19 serves to release the system.

The elastic element 17 exerts force on the piston 16, opposed by the activation pressure of the actuator 2 when such pressure is applied in the chamber 19.

In the embodiment illustrated in FIG. 1 the hydraulic system 1 comprises a pressurizing circuit 3 and a discharge circuit 4, both extending between a fluid tank 5 and a distributor 6.

The distributor 6 supplies the chamber 19 of the actuator 2 with pressurised fluid coming from a pump 10 or connects the chamber 19 to the discharge circuit 4, in this way controlling its action.

When the chamber 19 is supplied with pressurised fluid, this pressure is transformed into force by the piston 16, resulting in compressing the elastic element 17 and relaxing the brake.

When the chamber 19 is connected to the discharge circuit 4, the pressure in the chamber 19 drops, as does the force exerted by the piston 16 on the elastic element 17.

The elastic element 17 exerts clamping force on a series of static discs 7 and interleaved mobile discs 7.

The discs mobile 7 attached to the motor shaft 8 are pressed between the static discs 7 by the actuator 2 (by means of the elastic element 17), this action causing braking torque obtained by friction.

Because the braking torque of these systems is classically configured for extreme situations, it is too much to respond to specifications required for an emergency braking system, especially relative to risk of locking the wheels, despite the drop in braking torque linked to a situation of dynamic friction relative to static friction.

GENERAL PRESENTATION OF THE INVENTION

An aim of the invention is to modulate the braking torque, especially by achieving intermediate pressure to produce braking force not generating the locking of the wheels.

Another aim is to boost the energy capacity of the braking system.

According to an aspect, the invention proposes a braking device comprising an actuator, a pressurizing circuit supplying the actuator via a control pressure and a discharge circuit comprising means for controlling the flow rate of the supply fluid of the actuator, during the discharge of the actuator, characterized in that the control means comprise a discharge flow restrictor and a counter-pressure pressure restrictor configured to define an intermediate pressure between a low pressure level and the control pressure of the actuator.

Such a device is advantageously completed by the following different characteristics taken singly or in combination:

- The pressurizing circuit of the supply fluid of the actuator comprises a pump or a hydraulic accumulator and a pressure restrictor;
- The actuator comprises a chamber, a piston and an elastic element tending to return the piston to its rest position;
- The device comprises a distributor configured to assume at least two positions, a first position configured to supply the actuator with pressurized fluid, and a second position configured to discharge the actuator;
- The device comprises at least one counterpressure flow restrictor configured to supply the chamber of the actuator with fluid irrespective of the position of the distributor;
- The braking system also comprises brake discs, the elastic element is configured to exert force on the discs, the piston is configured to counter the force exerted by the elastic element when the chamber is supplied with fluid under control pressure;
- The distributor can be a monostable distributor with electric control having three orifices and two positions, its rest position putting the discharge circuit and the chamber of the actuator in fluidic communication, and an active position of the distributor putting the pressurizing circuit and the chamber of the actuator in fluidic communication;
- A counter-pressure supply nozzle can put the pressurizing circuit of the supply fluid of the actuator and the chamber of the actuator in fluidic communication;
- A counter-pressure supply nozzle can put the pressurizing circuit of the supply fluid of the actuator and the discharge circuit in fluidic communication;
- The device can also comprise a scanning nozzle located upstream of a decompression chamber comprising disc braking;
- The distributor can be a monostable distributor having four orifices and two positions:
  - A first position puts the pressurizing circuit and the decompression chamber in fluidic communication and also puts the discharge circuit and the chamber of the actuator in fluidic communication;
  - A second position puts the pressurizing circuit and the chamber of the actuator in fluidic communication and also puts the discharge circuit and the decompression chamber in fluidic communication.

According to another aspect, the invention proposes a hydraulic rotary machine comprising a braking system such as defined previously.

According to a preferred embodiment, the hydraulic machine is a machine with radial pistons and multi-lobe cam. The machine can have a rotating shaft and fixed casing or else a fixed shaft and rotating casing.

By way of variant, the hydraulic machine can be an axial piston machine, rotary vane machine or gear machine.

According to another aspect, the invention proposes a vehicle comprising such a hydraulic rotary machine.

PRESENTATION OF FIGURES

Other characteristics, aims and advantages of the invention will emerge from the following description which is purely illustrative and non-limiting and must be considered with respect to the appended drawings, in which:

FIG. 1 previously described is a fluid functioning diagram showing a solution of the prior art;

DESCRIPTION OF ONE OR MORE EMBODIMENTS

By way of pressure control means in its discharge circuit the invention proposes offering different levels of pressure in an actuator in a braking situation and therefore different braking torques.

The embodiments described hereinbelow relate to the case of a braking system 1 comprising a fluidic system supplying an actuator 2 configured to generate braking torque on a motor shaft.

The embodiments described hereinbelow are illustrative of examples and non-limiting, to the extent where different types of actuators, energy or control could be used.

Figure 1:
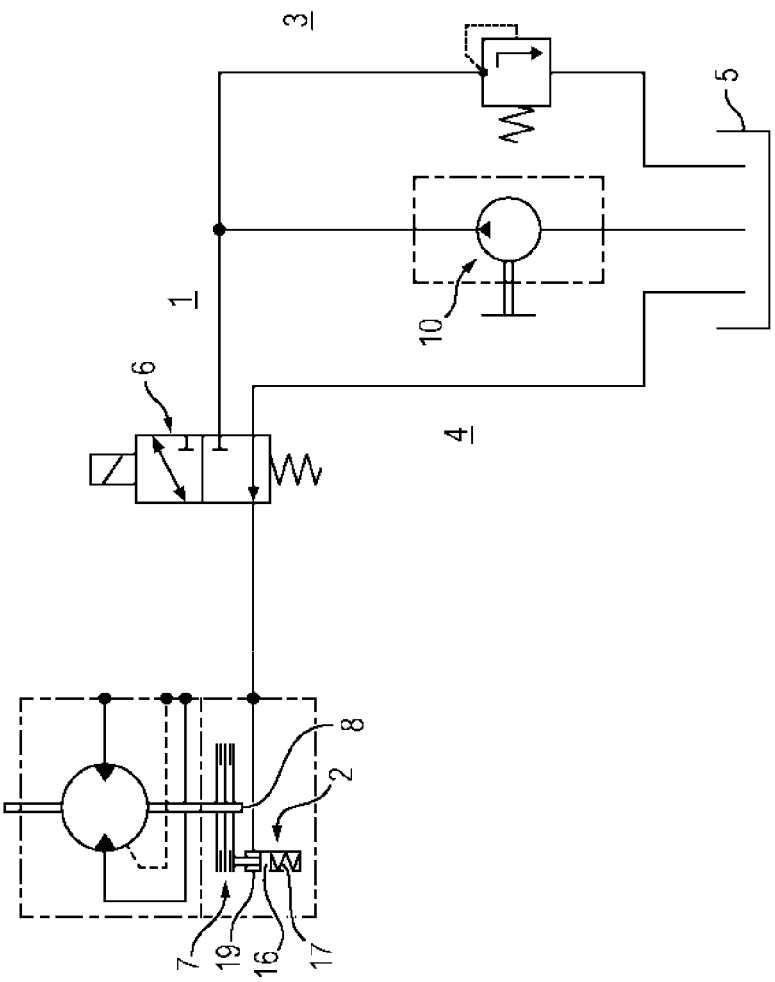
Figure 2:
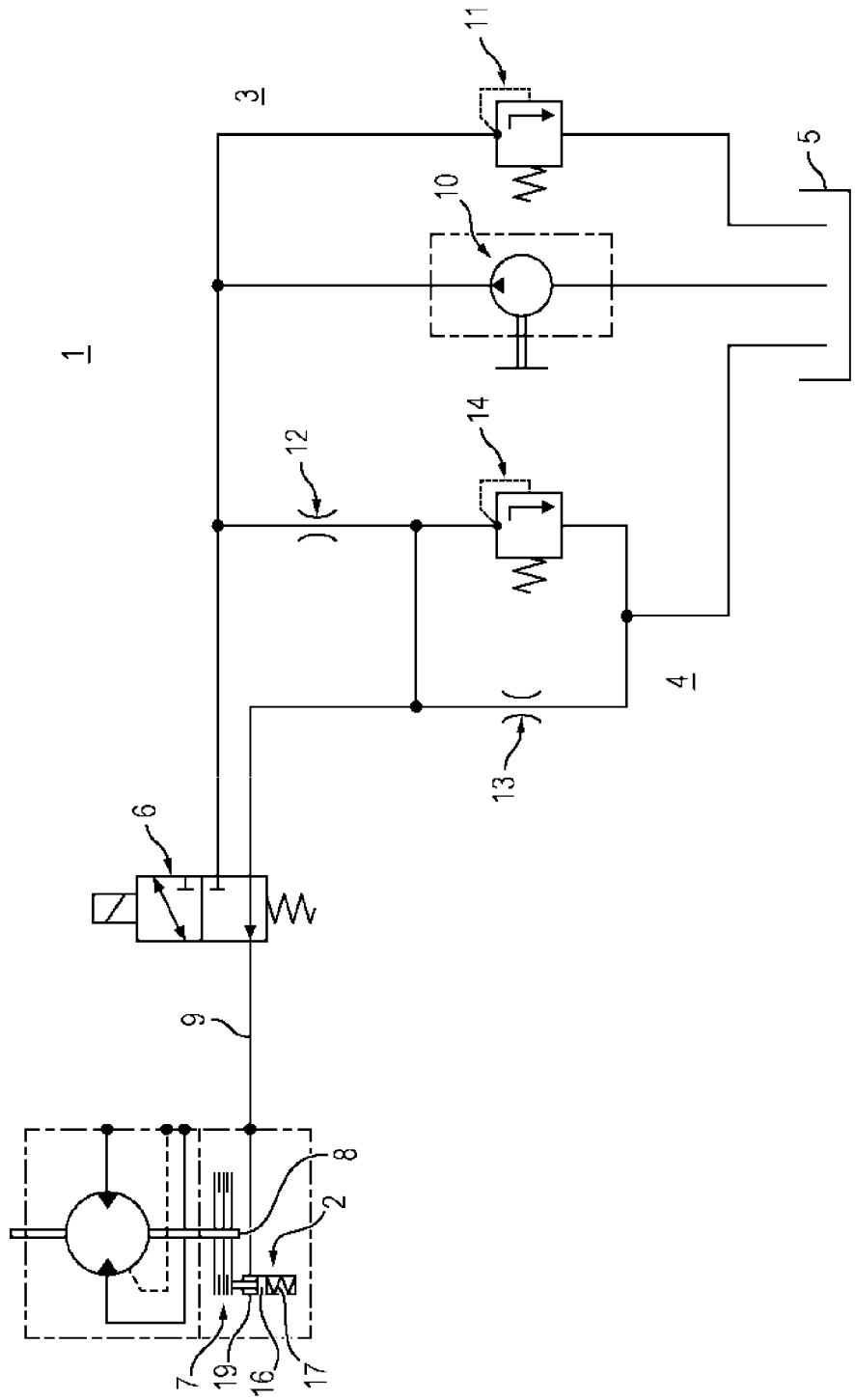
FIG. 2 is a fluid functioning diagram showing a first embodiment according to the present invention.

In the embodiment shown in FIG. 2, the actuator 2 configured to generate braking torque on a motor shaft 8 is a single-action jack comprising a chamber 19, a piston 16 and an elastic element 17 applying force to a row of fixed discs 7 interspersed with mobile discs 7 attached to the motor shaft 8. In other terms, at rest, the elastic element 17 stresses the fixed and mobile discs 7 in reciprocal support.

Preferably, but non-limiting, the chamber 19 and the elastic element 17 are placed respectively on either side of the piston 16, the elastic element working at compression.

This single-action jack 2 is configured to exert compression force on the discs 7, by way of the elastic element 17, when it is not supplied with pressurized fluid in the chamber 19, such that in a rest situation where the system is not supplied with energy, the braking system 1 exerts braking torque.

The jack 2 is supplied with fluid, in its chamber 19, by a pipe 9 connected to a distributor 6 having three orifices and two positions, forming the link between the supply pipe 9 of the jack 2 and the hydraulic pressurizing 3 and fluid discharge 4 circuits, both connected to a common tank 5.

By way of convention, in the rest of the text the notions of upstream and downstream will refer to the direction of flow of the fluid in the different circuits. In the pressurizing circuit 3, fluid flows from the tank 5 towards the jack 2, while in the discharge circuit 4 it flows from the jack 2 towards the tank 5.

Since the distributor 6 is monostable, one of the positions it can assume is a first position called «at rest», that is, one it occupies when it is not being supplied, a second position being called «active», this active position being consecutive to a command.

The position at rest corresponds to putting the chamber 19 of the jack 2 and the discharge circuit 4 of the fluid in fluidic communication, therefore allowing the chamber 19 of the jack 2 to discharge and the jack 2 to exert force on the brake discs 7 under the effect of stress from the elastic element 17.

The active position, controlled electrically, corresponds to putting the chamber 19 of the jack 2 and the pressurizing circuit 3 of the fluid in fluidic communication, resulting in compressing the elastic element 17 and in this way preventing it from exerting force on the brake discs 7.

The pressurizing circuit of the fluid 3 comprises a pump 10 pressurizing fluid coming from the tank 5, the pump 10 in this embodiment being powered, directly or indirectly, by the thermal motor of the machine.

A valve 11 located on a conduit parallel to that of the pump 10 is connected to the tank 5, limiting the pressure in the pressurizing circuit 3. To generate intermediate braking force to execute the emergency braking function, according to the present invention the pressurizing circuit 3 of the fluid is put in fluidic communication with the discharge circuit 4, the junction point being located upstream of the discharge circuit 4.

In fact, in a braking situation the distributor 6 is in its rest position, putting the jack 2 and the discharge circuit 4 in fluidic communication, operating and with the thermal motor the pump 10 continues to rotate.

The discharge circuit 4 is therefore subjected to counter-pressure so as to exert force resisting the return force of the elastic element 17 generating the braking torque, accordingly achieving intermediate braking torque.

The discharge circuit 4 and the pressurizing circuit 3 are therefore put in fluidic communication by means of a flow restrictor 12 or counter-pressure supply nozzle.

Downstream of this counter-pressure supply nozzle 12, the discharge circuit 4 comprises a flow restrictor or discharge nozzle 13 and a second valve 14 for configuring the value of the counterpressure and consequently the value of the emergency braking torque.

The discharge nozzle 13 and the counterpressure-regulating valve 14 are mounted in parallel, the conduit located downstream and terminating in the tank 5.

In other terms: the discharge nozzle 13 is connected to a first input of the distributor 6 and so connects the chamber 19 of the jack 2 to the tank 5, when the distributor 6 is in the rest position; the pressure-limiting valve 14 is placed in parallel with the nozzle 13; the nozzle 12 is placed between the second input of the distributor 6 and the point common to the nozzle 13 and to the valve 14; the pump 10 and the valve 11 are also placed in parallel between the second input of the distributor 6 and the tank 5.

When the emergency braking is activated, these dispositions rapidly discharge the brake, more precisely the chamber 19, by way of the counterpressure-regulating valve 14 to achieve the preferred emergency braking torque, while maintaining this pressure by way of communication between the pressurizing 3 and discharge 4 circuits by the counterpressure supply nozzle 12.

When the machine is idle, that is, pump 10 is stopped, the brake discharges gradually via the discharge nozzle 13 until the pressure drops to the level of the pressure of the tank 5, or atmospheric pressure in this embodiment. This level of pressure in the jack 2 achieves the parking braking torque.

In short, the first embodiment illustrated in FIG. 2 comprises:

an actuator 2 comprising a chamber 19, a piston 16 and an elastic element 17 configured to exert at rest a force on a stack of respectively fixed and mobile discs 7, and exert braking torque, a distributor 6 adapted to selectively connect the chamber 19 of the actuator to a hydraulic pressurizing circuit 3 or to a hydraulic discharge circuit 4 of the fluid, the hydraulic pressurizing circuit 3 being adapted to supply the chamber 19 and exert force resisting the force of the elastic element 17, and comprising a pump 10 pressurizing fluid coming from a tank 5, the hydraulic discharge circuit 4 being adapted by way of contrast to discharge the chamber 17, and comprising at the same time a flow restrictor 13 formed for example by a discharge nozzle, and a valve 14 for dimensioning the counterpressure value and consequently the value of emergency braking torque, and a flow restrictor 12, formed for example by a supply nozzle which ensures communication between the hydraulic pressurizing circuit 3 and the hydraulic discharge circuit 4, by connecting the output of the pump 10 and the input of the associated distributor 6 to the discharge circuit 4, such that when the pump 10 is in service and no braking is required the hydraulic pressurizing circuit 3 supplies the chamber 19 to cancel the force of the elastic element 17 on the discs 7, when the pump 10 is in service and emergency braking is activated, the discharge circuit 4 is subjected to counterpressure by means of the flow restrictors 12 and 13 and the valve 14 so as to exert force resisting the return force of the elastic element 17 generating intermediate braking torque, whereas when the pump 10 is stopped the chamber 19 is emptied by means of the flow restrictor 13 to produce parking braking torque, corresponding to the maximum braking torque.

Figure 3:
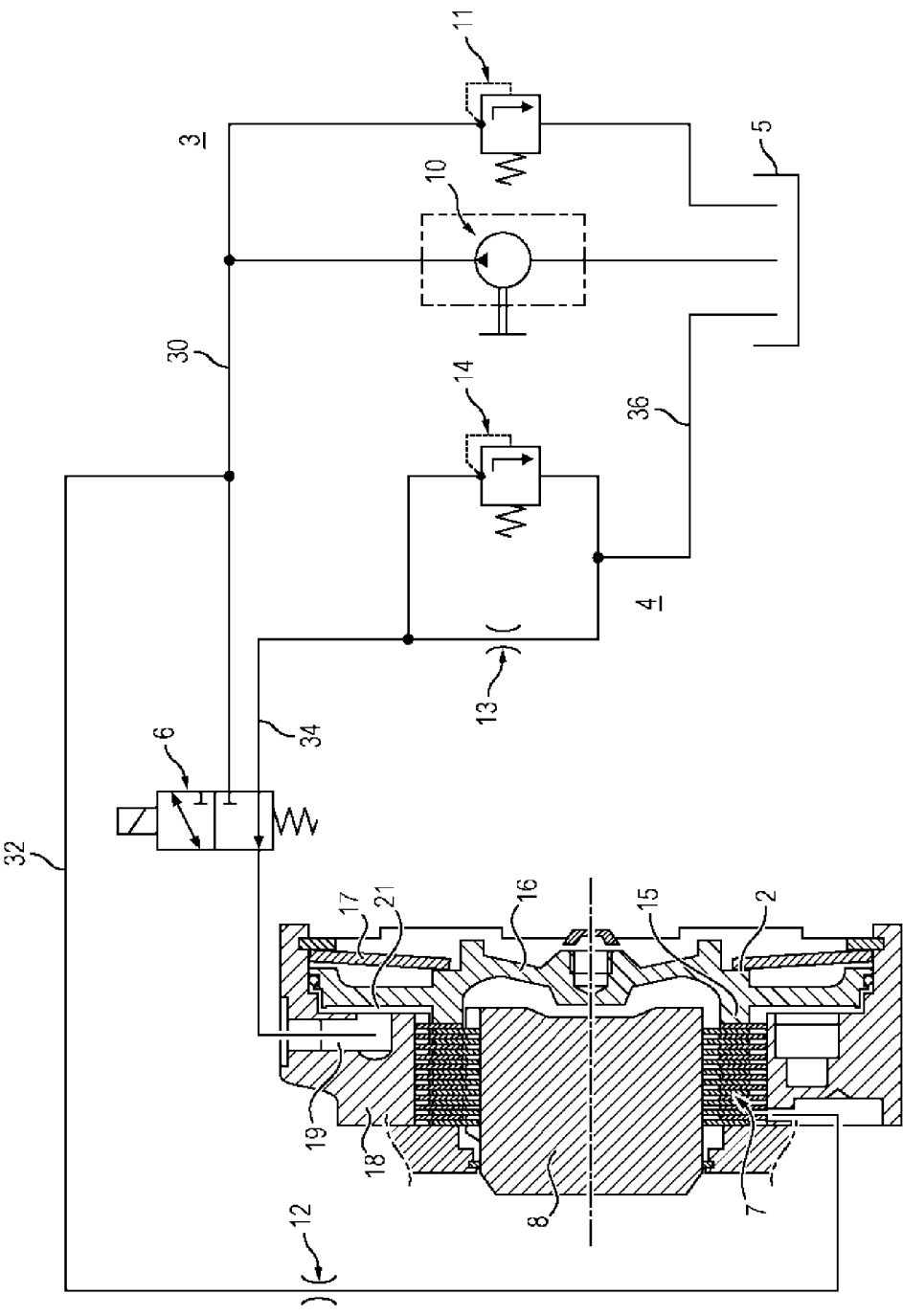
FIG. 3 is a fluid functioning diagram showing a second embodiment according to the present invention.

In a second embodiment illustrated in FIG. 3, the actuator 2 comprises an elastic element 17 or conical elastic washer exerting return force on a first face of a piston 16 or mobile flange. This is typically the case of a brake placed behind a hydraulic motor.

The elastic element 17 rests against an axial stop attached to the casing 18 of the actuator, and effects its return force on an annular surface of the piston 16.

This force transmitted by an annular protrusion 15 made on the second face of the piston 16 engenders braking torque by compressing a row of fixed discs 7 alternating with a row of mobile discs 7 attached to the brake shaft 8 of the hydraulic motor. In some mountings, the brake shaft and the motor shaft form just a single piece.

The piston 16 forms a chamber 19 by cooperating tightly sealed with the casing 18. This chamber 19 also contains the brake discs 7 and is delimited by the second face of the piston 16. The chamber 19 is in fluidic communication with pressurizing 3 and fluid discharging 4 circuits.

The pressurizing fluid circuit 3 comprises a tank 5, a pump 10 and a pressure restrictor 11 mounted in parallel downstream of this tank 5 and a first pipe 30 which connects an input of the distributor 6 to the common point on the pump 10 and to the restrictor 11.

A second pipe 32 is connected to the first pipe 30 upstream of the distributor 6. The second pipe 32 leads to a flow restrictor or counter-pressure supply nozzle 12 putting the pressurizing circuit 3 and the chamber 19 in fluidic communication, the fluid being injected in the region of the brake discs 7.

The fluid discharge circuit 4 is supplied by the chamber 19 of the brake, in the region of an annular surface 21 of the piston 16 and comprises a third pipe 34 extending between the other input of the distributor 6 and an assembly in parallel with a flow restrictor or discharge nozzle 13 and a pressure restrictor or counterpressure regulator 14, this assembly being placed in communication with the tank 5 by a fourth pipe 36.

The distributor 6 is a monostable distributor having three orifices and two positions, controlled electrically. In its rest position, it puts the chamber 19 and the discharge circuit 4 in fluidic communication, progressively discharging the chamber 19 and therefore boosting braking torque via the parallel arrangement comprising the nozzle 13 and the pressure restrictor 14.

In its active position, the distributor 6 puts the pressurizing circuit 3 and the chamber 19 in fluidic communication, shifting the piston 16 by compressing the elastic element 17 under the effect of the increase in pressure on the first face of the piston 16. The brake is accordingly released.

This embodiment does not consume the flow rate when the brake is relaxed, as there is no fluidic communication between the pressurizing circuit 3 and the discharge circuit 4 when the distributor 6 is in the active position.

When the distributor 6 is deactivated, for example in the case of emergency braking, it reprises its rest position. The chamber 19 is put in fluidic communication with the discharge circuit 4. The pressure in the chamber 19 rapidly takes its counter-pressure value due to the counterpressure regulator 14, this value being maintained by the fluidic communication between the pressurizing circuit 3 of the fluid and the chamber 19 in the region of the scanning supply nozzle 12.

The supply fluid of the actuator is therefore injected into the region of the brake discs 7, the effect of which is to scan the discs 7 in the case of dynamic braking, therefore of relative movement between the fixed discs 7 and the mobile discs 7. This scanning improves thermal transfer between the discs 7 and the fluid and therefore increases the energetic capacity of the brake during braking.

When the motor is cut, the pump 10 of the pressurizing circuit 3 is no longer being powered, the fluid of the chamber 19 is discharged via the discharge nozzle 13 to balance pressures between the tank 5 and the chamber 19. The parking braking torque is now achieved.

In short, the second embodiment illustrated in FIG. 3 comprises:

an actuator 2 comprising a chamber 19, a piston 16 and an elastic element 17 at rest configured to exert force on a stack of respectively fixed and mobile discs 7, and accordingly exert braking torque, a distributor 6 adapted to selectively connect the chamber 19 of the actuator to a hydraulic pressurizing circuit 3 or to a hydraulic fluid discharge circuit 4, the hydraulic pressurizing circuit 3 being adapted to supply the chamber 19 and exert force resisting the force of the elastic element 17, and comprising a pump 10 pressurizing fluid coming from a tank 5, the hydraulic discharge circuit 4 being adapted in contrast to discharge the chamber 17, and at the same time comprising a flow restrictor 13, formed for example by a discharge nozzle, and a valve 14 for dimensioning the value of counterpressure and consequently the value of emergency braking torque, and a flow restrictor 12, formed for example by a supply nozzle, which ensures communication between the hydraulic pressurizing circuit 3 and the chamber 19, by connecting for example the output of the pump 10 and the chamber which houses the brake discs 7, such that when the pump 10 is in service and no braking is required the hydraulic pressurizing circuit 3 supplies the chamber 19 to cancel the force of the elastic element 17 on the discs 7, when the pump 10 is in service and emergency braking is activated, the discharge circuit 4 is subjected to counterpressure by means of the flow restrictor 13 and the valve 14 so as to exert force resisting the return force of the elastic element 17 generating intermediate braking torque while exerting a scan of the brake discs via the second pipe 32, while when the pump 10 is stopped the chamber 19 is emptied by means of the flow restrictor 13 to achieve parking braking torque, corresponding to the maximum braking torque.

Figure 4:
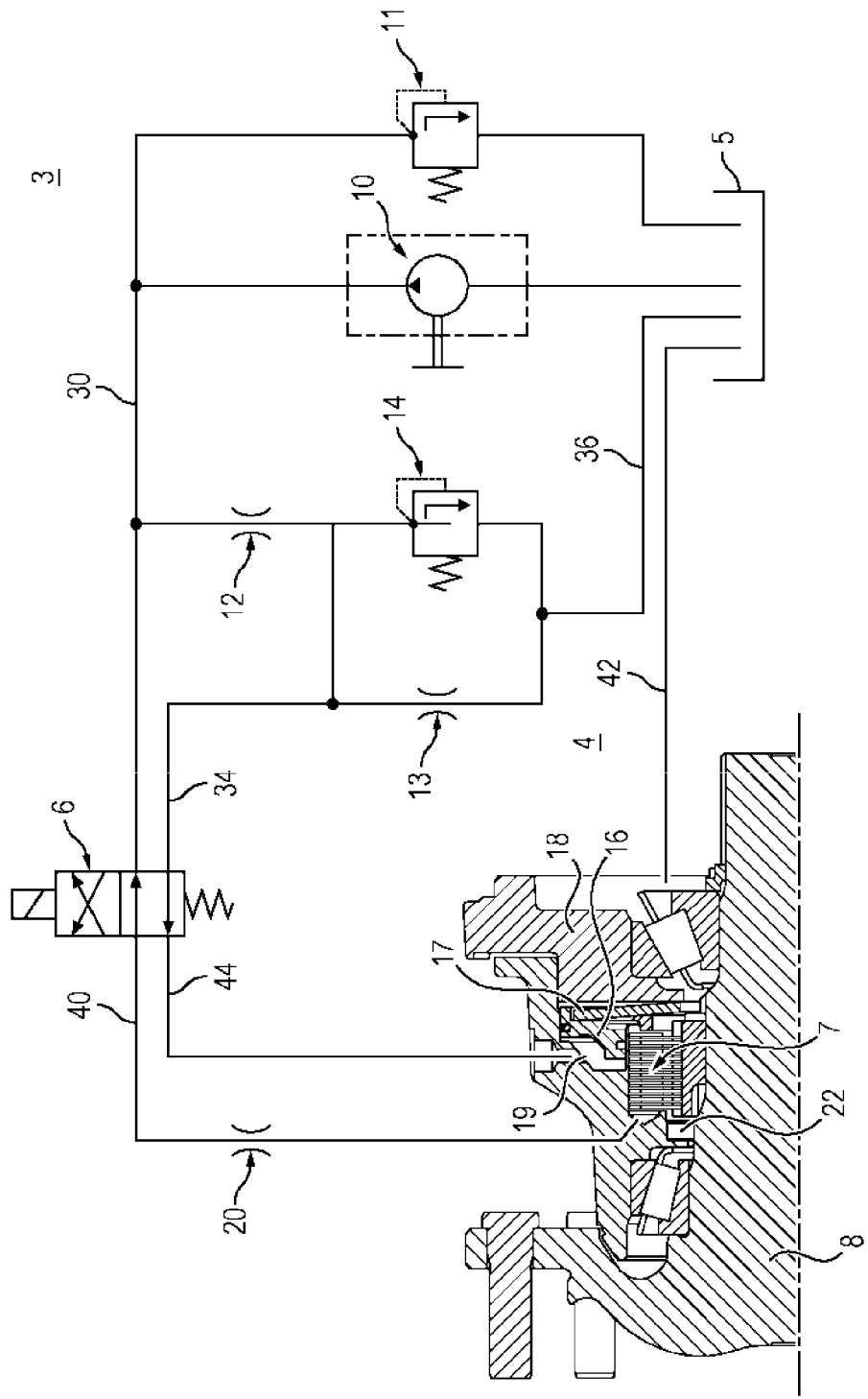
FIG. 4 is a fluid functioning diagram of a third embodiment according to the present invention.
Figure 5:
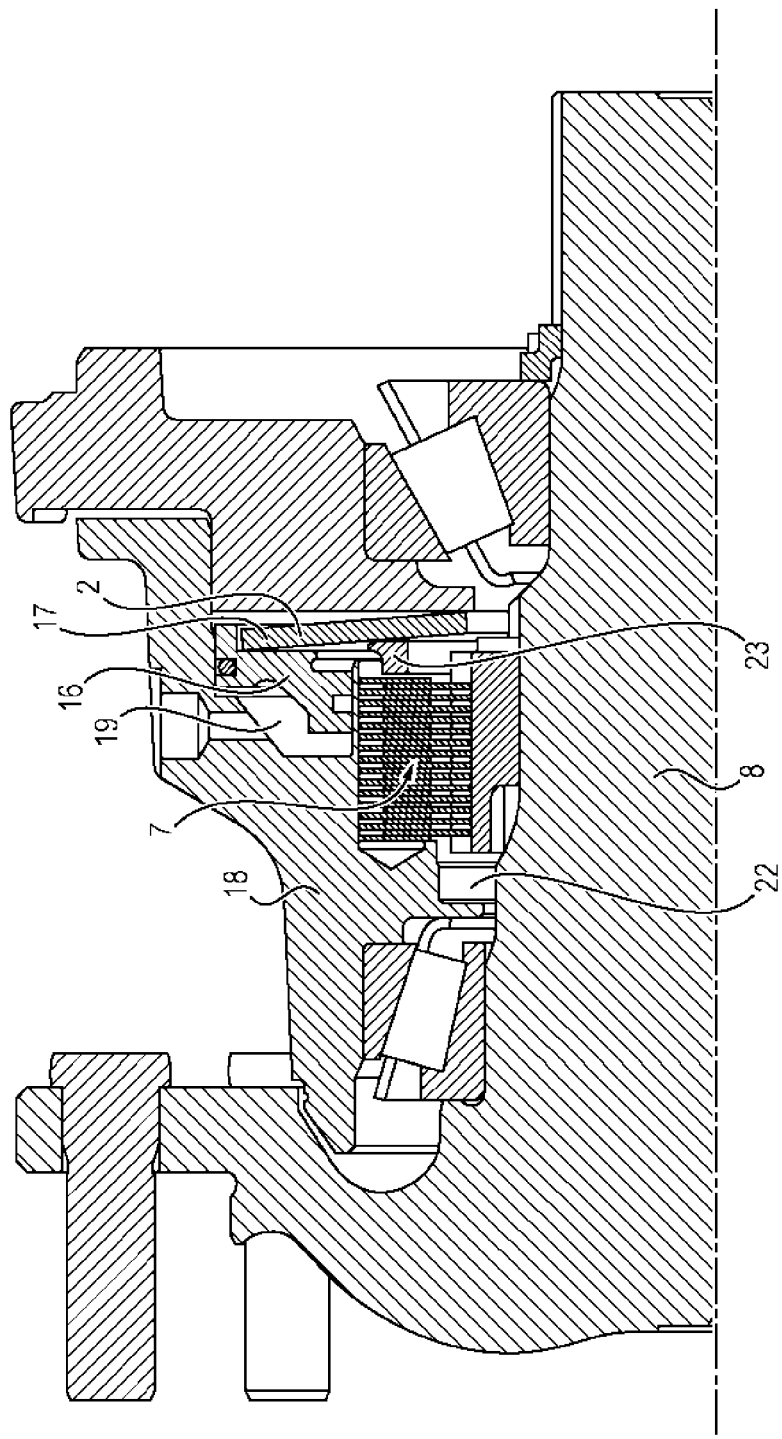
FIG. 5 is an enlarged view of the bearing of a hydraulic motor used in the circuit of FIG. 4.

In another embodiment presented in FIGS. 4 and 5, the braking system comprises a series of fixed discs 7 alternating with a series of mobile discs 7 fixed on the motor shaft 8, these discs 7 being contained in a first decompression chamber 22 and actuated by an actuator 2 comprising an elastic element 17 or elastic conical washer, exerting return force on the discs 7 by means of an annular ring 23. This is especially the case when the brake system is located in the bearing of a thermal motor.

The elastic element 17 extends radially as far as a piston 16 or annular piston concentric to the brake discs 7.

This piston 16 is contained in a second cavity concentric to the decompression chamber 22, the piston 16 forming with a casing 18 a chamber 19 or loosening chamber in this cavity.

In reference to FIG. 4, the decompression chamber 22 is put in fluidic communication with a distributor 6 via a pipe 40 comprising a flow restrictor or scanning nozzle 20. The fluid can also transit via the decompression chamber 22 and a tapered roller bearing to then be returned to a tank 5 via a discharge pipe 42. The chamber 19 is in fluidic communication with a pipe 44 leading to the distributor 6.

The distributor 6 is a monostable distributor having four orifices and two positions, controlled electrically. As a variant the distributor can have mechanical, hydraulic or pneumatic control.

It puts the abovementioned chambers 19, 22 and pressurizing 3 and fluid discharge circuits 4 in fluidic communication.

The pressurizing circuit 3 comprises a pump 10 and a pressure restrictor 11 mounted in parallel between an upstream tank 5 and a downstream pipe 30, the downstream pipe 30 being put in fluidic communication with the discharge circuit 4 by means of a flow restrictor or counterpressure supply nozzle 12.

The discharge circuit 4 comprises an upstream pipe 34 extending between the distributor 6 and a parallel assembly of a pressure restrictor or counterpressure regulator 14 and a flow restrictor or discharge nozzle 13.

A downstream pipe 36 joins the tank 5 and the parallel assembly comprising the discharge nozzle 13 and the counterpressure regulator 14.

In the rest position of the distributor 6, the pressurizing circuit 3 of the fluid is joined fluidically with the decompression chamber 22 via the pipes 30 and 40, while the chamber 19 is put in fluidic communication with the discharge circuit 4 via the pipes 44 and 34.

In the active position of the distributor 6, the pressurizing circuit 3 is put in fluidic communication with the chamber 19 via the pipes 30 and 44, the piston 16 acting on the elastic element 17 and therefore relaxing the brake discs 7.

In the active position of the distributor 6, the decompression chamber 22 is joined fluidically to the discharge circuit 4 via the pipes 40 and 34.

Putting the discharge 4 and pressurizing circuits 3 in fluidic communication in the active position of the distributor 6 supplies the decompression chamber 22 of the discs 7 with fluid by means of the counter-pressure supply nozzle 12 and the scanning nozzle 20.

When the distributor 6 is reset to the rest position, for example during emergency braking, the pressure in the chamber 19 drops rapidly by the action of the counterpressure regulator 14, limiting the force exerted by the elastic element 17 on the brake discs 7 and therefore limits the braking torque.

The level of counterpressure is maintained by fluidic joining the pressurizing 3 and fluid discharging 4 circuits and the counterpressure regulator 14, the fluid of the discharge circuit 4 flowing towards the tank 5 by passing through the discharge nozzle 13.

The decompression chamber 22 of the discs is supplied by the pressurizing circuit 3 with fluid, the fluid flowing towards the tank 5 by passing through the decompression chamber 22 and the tapered roller bearing, creating scanning of the brakes.

The rate of this flow is limited by the scanning nozzle 20.

When the motor is switched off, the pump 10 is no longer being supplied and the pressure in the chamber 19 drops while the fluid flows through the discharge nozzle 13 until the pressure in the chamber 19 reaches the value of the pressure of the tank 5, activating the parking brake.

In short, the third embodiment illustrated in FIGS. 4 and 5 comprises:

an actuator 2 comprising a chamber 19, a piston 16 and an elastic element 17 configured to exert at rest a force on a stack of respectively fixed and mobile discs 7, and accordingly exert braking torque, as well as a decompression chamber 22, a distributor 6 adapted to selectively connect the chamber 19 of the actuator to a hydraulic pressurizing circuit 3 or to a hydraulic fluid discharge circuit 4, and inversely the decompression chamber 22, by means of a flow restrictor 20, to the discharge circuit 4 or the pressurizing circuit, the hydraulic pressurizing circuit 3 being adapted to supply the chamber 19 and exert force resisting the force of the elastic element 17, and comprising a pump 10 pressurizing fluid coming from a tank 5, the hydraulic discharge circuit 4 being adapted in contrast to discharge the chamber 17, and at the same time comprising a flow restrictor 13 formed for example by a discharge nozzle, and a valve 14 for dimensioning the counterpressure value and consequently the value of emergency braking torque, and a flow restrictor 12, formed for example by a supply nozzle, which ensures communication between the hydraulic pressurizing circuit 3 and the hydraulic discharge circuit 4 by connecting the output of the pump 10 and the input of the associated distributor 6 to the discharge circuit 4, such that when the pump 10 is in service and no braking is required the hydraulic pressurizing circuit 3 supplies the chamber 19 to cancel the force of the elastic element 17 on the discs 7, while the decompression chamber 22 is connected to the discharge circuit 4 by means of the flow restrictors 20 and 13, when the pump 10 is in service and emergency braking is activated, the discharge circuit 4 is subjected to counterpressure by means of the flow restrictors 12 and 13 and the valve 14 so as to exert force resisting the return force of the elastic element 17 generating intermediate braking torque while performing a scan of the brake discs via the pipe 40, while when the pump 10 is stopped the chamber 17 is emptied by means of the flow restrictor 13 to obtain parking braking torque, corresponding to maximum braking torque.

The embodiments previously described perform an emergency braking function from the parking braking system and binary control.

Reduced pressure in the brake can be obtained either by fixed calibration, or by an adjustable version. The adjustment value could be fixed or could vary according to parameters of the machine or operation.

It is possible however to perform this function adding a valve controlled by a potentiometer for regulating the pressure of the chamber of the braking actuator, though this solution represents extra cost and adds an operating panel.

By way of alternative, a hydraulic pressure accumulator can be used as addition to or replacement for the pump 10.

The assembly according to the present invention uses the same brake system for parking and the emergency brake, without locking the wheels with different available braking torques. If the pump 10 turns, the braking is an emergency braking (intermediate braking torque). If the pump 10 is stopped, the braking is a parking braking (maximum braking torque).

The invention claimed is:

1. An emergency braking device comprising an actuator (2), a pressurizing circuit (3) supplying the actuator (2) via a control pressure and a discharge circuit (4) comprising means (13, 14) for controlling the flow rate of the supply fluid of the actuator (2), during a discharge of the actuator (2), characterized in that the control means comprise a discharge flow restrictor (13) and a counter-pressure pressure restrictor (14) configured to define an intermediate pressure between a low pressure level and the control pressure of the actuator (2)), wherein the device comprises at least one counter-pressure supply nozzle (12) configured to supply a chamber (19) of the actuator (2) with fluid, and the supply nozzle (12) supplies the chamber (19) of the actuator by means of a chamber containing brake discs (7).

2. The braking device according to claim 1, characterized in that the discharge flow restrictor (13) and the counter-pressure pressure restrictor (14) are connected in parallel between a distributor (6) capable of ensuring a connection to a chamber (19) of the actuator (2), and a tank (5).

3. The braking device according to claim 1, wherein the pressurizing circuit (3) of the fluid comprises a pump (10) and a pressure restrictor (11).

4. The braking device according to claim 1, wherein the braking device comprises a distributor (6) configured to assume at least two positions, a first position configured to supply the actuator (2) with pressurized fluid and a second position configured to discharge the actuator (2).

5. The braking device according to claim 1, wherein the actuator (2) is a brake piston of a hydraulic rotary machine.

6. A rotary machine comprising the braking device according to claim 1.

7. A vehicle comprising the braking device according to claim 1.

8. The braking device according to claim 1, wherein the actuator (2) comprises a chamber (19), a piston (16) and an elastic element (17) which stresses the piston (16) in a rest position, and the braking device includes the brake discs (7), the elastic element (17) is configured to exert force on the discs (7), and the piston (16) is configured to counter the force exerted by the elastic element (17) when the chamber (19) is supplied with fluid under control pressure.

9. The braking device according to claim 8, wherein the braking device comprises a monostable distributor (6) with electric control having three orifices and two positions, which in the rest position puts the discharge circuit (4) and the chamber (19) of the actuator (2) in fluidic communication, and in the active position puts the pressurizing circuit (3) and the chamber (19) of the actuator (2) in fluidic communication.

10. The braking device according to claim 9, wherein the counter-pressure supply nozzle (12) puts the pressurizing circuit (3) of the fluid and the chamber (19) of the actuator (2) in fluidic communication.

11. The braking device according to claim 9, wherein the counter-pressure supply nozzle (12) puts the pressurizing circuit (3) of the fluid and the discharge circuit (4) in fluidic communication.

12. The braking device according to claim 1, wherein the braking device also comprises a scanning nozzle (20) located upstream of a decompression chamber (22) comprising the discs (7).

13. The braking device according to claim 12, wherein the distributor (6) is a monostable distributor (6) having four orifices and two positions:
A first position which puts the pressurizing circuit (3) and the decompression chamber (22) in fluidic communication and also puts the discharge circuit (4) and the chamber (19) of the actuator (2) in fluidic communication;
A second position which puts the pressurizing circuit (3) and the chamber (19) of the actuator (2) in fluidic communication and also puts the discharge circuit (3) and the decompression chamber (22) in fluidic communication.

14. The braking device according to claim 1, wherein the braking device comprises a second restriction (12) which connects the pressurizing circuit (3) and the chamber (19) of the actuator (2) directly or by means of a brake disc chamber.

15. An emergency braking device comprising an actuator (2), a pressurizing circuit (3) supplying the actuator (2) via a control pressure and a discharge circuit (4) comprising means (13, 14) for controlling the flow rate of the supply fluid of the actuator (2), during a discharge of the actuator (2), wherein the control means comprise a discharge flow restrictor (13) and a counter-pressure pressure restrictor (14) configured to define an intermediate pressure between a low pressure level and the control pressure of the actuator (2), wherein the device comprises at least one counter-pressure supply nozzle (12) configured to supply a chamber (19) of the actuator (2) with fluid, and the supply nozzle (12) is connected to an assembly comprising the discharge flow restrictor (13) and the counter-pressure pressure restrictor (14) placed in parallel on the discharge circuit (4).

16. A rotary machine comprising the braking device according to claim 15.

17. A vehicle comprising the braking device according to claim 15.

* * * * *